United States Patent [19]
Ocampo

[11] 3,907,354
[45] Sept. 23, 1975

[54] TERRARIUM TOOL

[76] Inventor: Armando V. Ocampo, c/o A & N Terrarium Tool Company, 5979 Hasta Ln., San Jose, Calif. 95124

[22] Filed: Apr. 4, 1974

[21] Appl. No.: 457,926

Related U.S. Application Data

[62] Division of Ser. No. 382,816, July 26, 1973, abandoned.

[52] U.S. Cl. ............... 294/19 R; 47/34; 128/321; 294/104; 30/251
[51] Int. Cl.² ... A01G 3/00; B25B 7/08; B26B 13/26
[58] Field of Search ............ 294/104, 19 R; 47/34; 128/324, 321, 354; 30/244–245, 251

[56] References Cited
UNITED STATES PATENTS

| | | | |
|---|---|---|---|
| 198,313 | 12/1877 | Poole | 294/104 X |
| 585,947 | 7/1897 | Barry et al. | 128/324 |
| 1,297,319 | 3/1919 | Bullard | 294/19 R X |
| 1,521,524 | 12/1924 | Fuller | 294/104 |
| 1,910,725 | 5/1933 | Valenta | 294/104 X |
| 3,387,877 | 6/1968 | Christodolu | 294/104 X |

*Primary Examiner*—Robert E. Bagwill
*Attorney, Agent, or Firm*—Phillips, Moore, Weissenberger Lempio & Strabala

[57] ABSTRACT

A remote manipulating device is disclosed which is useful as a terrarium tool. The device comprises a scissors movement tool such as a scissors or a pinchers. One arm of the tool is extended in length through connection with a linear member. The other arm of the tool is pivotally mounted to a long handle. When the jaws of the scissors movement tool are closed the entire device is sufficiently narrow to pass easily through the mouth of a typical terrarium bottle. In use the scissors movement portion of the terrarium tool is inserted into the bottle and the movements of the jaws of the scissors movement tool are controlled by manipulating the end of the long linear member and the end of the handle. Due to the pivoting of the handle on one arm of the scissors movement tool, it is possible to open and close the jaws of the scissors movement tool while moving the long handle substantially parallel to the long linear member. The scissors movement tool can thereby be used to dig holes within the terrarium, place plants in holes, remove debris, prune, and the like.

3 Claims, 4 Drawing Figures

US Patent   Sept. 23,1975   3,907,354
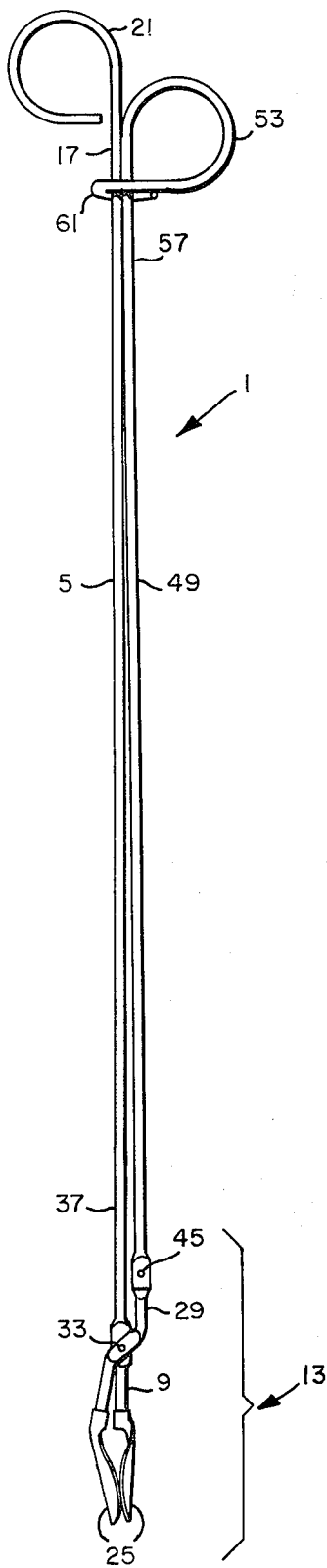
FIG.1
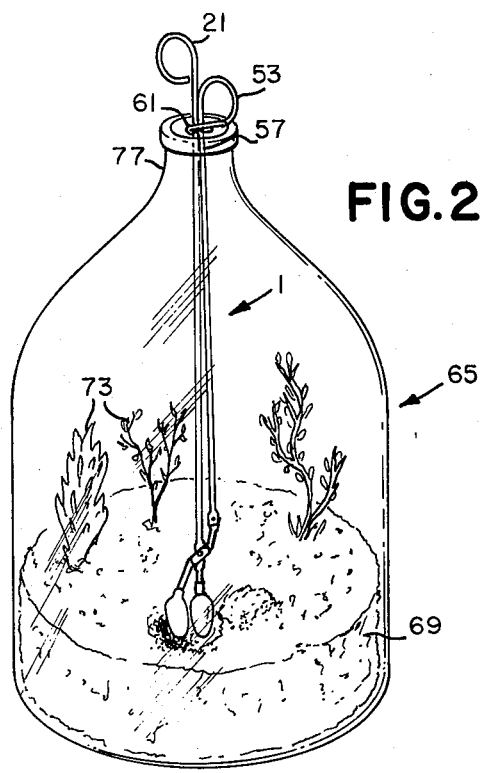
FIG.2
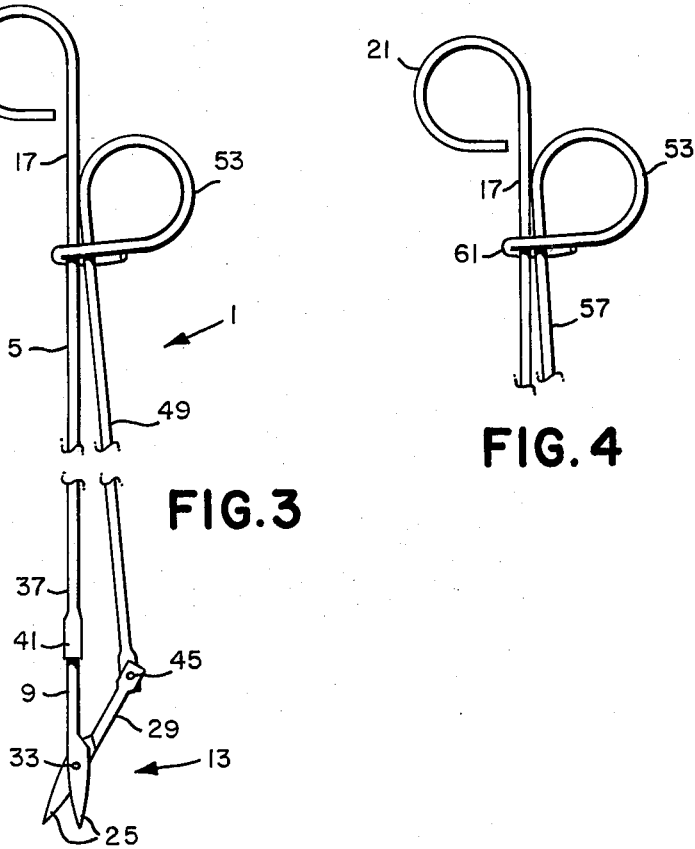
FIG.3
FIG.4

TERRARIUM TOOL

This is a division, of application Ser. No. 382,816, filed July 26, 1973, and now abandoned.

BACKGROUND OF THE INVENTION

The invention relates to the art of caring for plants that are growing within a terrarium, the interior of which is not easily excessable because of a restricted opening in a bottle which in combination with soil and plants, comprises the terrarium.

The care and growing of plants in a terrarium is a growing hobby field. It is also a relatively inexpensive hobby since all that one needs is a proper container for the terrarium and soil and plants to place within the terrarium. While terrariums can be managed within containers which have a relatively large opening at the top through which the hobbyist can insert his hands or ordinary size tools to prune, plant, and fertilize the plants in the terrarium, a cover must be provided for such open terrariums in order to insure that a balanced ecological cycle of plant growth will take place within the terrarium relatively unaffected by outside conditions. Also, terrariums within narrow necked bottles are more attractive for display. Thus, it is more popular to use as a terrarium a large bottle having a restricted opening. Typical of such bottles are the common 5-gallon glass water bottles.

When one uses a bottle having a restricted opening through which the hands can not pass as a terrarium bottle, serious manipulating problems are introduced in digging holes for plants within the bottle, placing the plants within holes, fertilizing the plants when necessary, removing debris such as the dead leaves, pruning the plants, and the like. In the past the hobbyist has often been reduced to the expediency of utilizing what amounts to two long sticks when working within his terrarium. Occasionally hobbyists have fastened a spoon to the end of a long rod to provide a digging tool for use within the terrarium. Using such tools, the placing of plants within the terrarium and the handling of other necessary terrarium management tasks has been very difficult. It would, therefore, be a distinct advantage if a terrarium tool could be provided which would allow the use of a scissors movement tool within a terrarium having a restricted opening. It would be even more advantageous if the scissors movement tool could be operated in an easy and positive manner by the hobbyist.

Accordingly, it is an object of the invention to provide a scissors movement tool which will fit within a terrarium having a restricted opening and will be manipulatable from outside of the terrarium.

It is another object of the invention to provide a remotely operable scissors movement tool capable of positive activation from without the terrarium.

These and other objects of the invention are attained as set out herein.

BRIEF DESCRIPTION OF THE DRAWING

The invention will be better understood by reference to the drawing which is hereby referred to and incorporated herein by reference thereto and in which:

FIG. 1 is a side view illustrating an improved terrarium tool that is constructed in accordance with the present invention;

FIG. 2 is a perspective view illustrating a remotely manipulated scissor movement tool in use within a terrarium;

FIG. 3 is a view illustrating a remotely manipulatable scissors movement tool in accordance with the present invention wherein the scissors movement tool comprises a scissors; and FIG. 4 is a blown up view illustrating means for controlling the relative movement of the remote extensions of the scissors movement tool.

SUMMARY OF THE INVENTION

The invention comprises a remote manipulating device. The device comprises a linear member, a scissors movement tool having one arm thereof attached adjacent one end of said linear member, and means pivotally attached to the second arm of said tool for remotely manipulating said tool. In a preferred embodiment, the arm of the tool attached adjacent one end of the linear member is attached longitudinally thereto. Generally, the length of the linear member is at least five times the length of the second arm of the tool. In a preferred embodiment, the means pivotally attached to the second arm of the tool for remotely manipulating the tool comprises a handle and the path of motion of the handle is restricted to be substantially parallel to the linear member.

DESCRIPTION OF THE PREFERRED EMBODIMENTS

The invention will be still better understood by detailed reference to the drawing wherein like numbers denote like parts throughout.

Referring now to the drawing, a remote manipulating device, namely a terrarium tool, is indicated generally by the numeral 1. The remote manipulating device 1 includes a linear member 5 having attached at one end thereof one arm 9 of a scissors movement tool 13. The arm 9 of the scissors movement tool 13 is pivotally attached to the linear member 5 longitudinally thereof. At the end 17 of the linear member 5 which is furthest from the scissors movement tool 13 there is attached a gripping means 21 in the form of a loop.

The remote manipulating device 1 illustrated in FIGS. 1 and 2 has as jaws 25 of the scissors movement tool 13 a pair of opposing spoon (miniature shovel) shaped members. The remote manipulating device 1 illustrated in FIG. 3 has as the scissors movement tool 13 thereof a scissors whereby the jaws 25 of the scissors movement tool 13 are typical scissors blades.

The second arm 29 of the scissors movement tool 13 is pivotally attached at the pin 33 to the non-gripping end 37 of linear member 5. As is shown in FIG. 3, attachment of arm 9 to a non-gripping end 37 of linear member 5 can be accomplished by providing non-gripping end 37 with a sleeve 41 into which arm 9 is force fitted. The second arm 29 of scissors movement tool 13 is pivotally attached by pin 45 to linear handle 49.

Linear handle 49 extends from its point of attachment at pin 45 to the vicinity of the end of linear member 5. A gripping means 53 is provided adjacent the end 57 of linear handle 49 which is farthest from scissors manipulating tool 13. The gripping means 53 is generally in the form of a loop suitable for insertion of the fingers.

Attached to the handle 49 adjacent the end 57 thereof is a loop 61 which passes around the end 17 of the linear member 5. The loop 61 restricts the movement of the linear handle 49 to be substantially parallel to said linear member 5. When the term substantially parallel is used it is realized that due to the pivoting that may take place at pin 45 some separation occurs between linear member 5 and linear handle 49. The gripping loop 53, however, is restricted to travel substantially parallel to said linear member 5.

In operation the terrarium tool 1, as illustrated in FIG. 2, is operated through movement of the loops 21 and 53 exterior of the terrarium bottle 65. The jaws 25 of the scissors movement tool 13 are thereby activated as desired by the manipulator of the of the handles 21 and 53 to accomplish digging operations in the soil 69, picking up leaves of the plant 73, and the like.

It is preferred that the loop 53 when drawn as close as possible to the loop 21 be at least about ¾ of an inch below the hoop 21 whereby the terrarium tool 1 can be easily operated by a single hand with the thumb placed through the loop 53 and the middle finger placed through the loop 21. When the operator uses only one hand to manipulate the terrarium tool 1 he can place his head down adjacent the level of the soil 69 so that he can see and direct the operation of the scissors movement tool 13, thus providing him with good control when manipulating the scissors movement tool 13 within the terrarium bottle 65.

The loop 61 which restricts movement of the loop 53 to be substantially parallel to linear member 5 is useful in insuring that no great separation of the linear member 5 from the linear handle 49 can occur within the bottle neck 77.

In practice the operation of the terrarium tool 1 is extremely simple. The operator simply places the scissors movement tool 13 within the terrarium bottle 65, places his thumb through the loop 53 and his middle finger through the loop 21. He then leans his head down to where he can observe the scissors movement tool 13 in operation and proceeds to manipulate the jaws 25 of the scissors movement tool 13 through movement of the loop 53 relative to the loop 21. It is of course possible to use one hand to grip the loop 21 and the other hand to grip the loop 53 but the mode of operation described immediately above has been found to be most advantageous.

It should be apparent that the downward movement of linear handle 49 leads to a rotation about pin 45 and to a separation of the jaws 25. The pin 45 is also separated by the downward movement of the handle 49 from the arm 9 of the scissors movement tool 13. Pulling up on the loop 53 then results in pulling up on the linear handle 49 with a concurrent closing of the jaws 25, and as may be seen from FIG. 3, the jaws 25 may be the blades of a scissors in which case the terrarium tool 1 will be useful for pruning plants within the terrarium bottle 65.

While the embodiments illustrated in the drawing are of terrarium tools wherein the arm 9 attached to the linear member 5 is attached longitudinally thereof it is to be understood that the attachment can readily be made at an angle to the linear member 5. In such a tool, the second arm 29 will generally be longer than the arm 9.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A remote manipulating device adapted to be straightenable so that it can pass through the neck of a narrow necked transparent terrarium bottle having soil therein for the growing of miniature enclosed gardens, said device being useful for the tending of said gardens, comprising:
   1. A first linear member having a first loop at one end thereof suitable for gripping;
   2. A scissors movement tool having two arms, one arm thereof integrally and longitudinally attached to the other end of the first linear member; and
   3. A second linear member having two ends, pivotally attached at one end thereof to the second of the two arms of the scissors movement tool, the second of the ends of the second linear member extending to the vicinity of the one end of the first linear member, said second linear member having a second loop at said second end thereof suitable for gripping, said second linear member further having an eye extending from said second loop around said first linear member, said eye serving to restrict the path of motion of said second loop to be substantially parallel to said first linear member, the length of said first linear member being at least about five times the length of said second of the arms of said scissors movement tool, the second loop being at least about three-quarters of an inch closer to the scissors movement tool than is the first loop, both the first loop and the second loop being adapted for manipulation from without said terrarium bottle adjacent the narrow neck thereof, said remote manipulating device being substantially straight when said second loop is moved to its closest approach to said first loop so that said scissors movement tool can pass through the neck of the narrow neck bottle and be manipulable by motion of said second loop relative to said first loop as constrained by said eye for tending said gardens.

2. A device as in claim 1, wherein said scissors movement tool comprises a scissors.

3. A device as in claim 1, wherein said scissors movement tool comprises a pair of opposing spoon shaped members.

* * * * *